April 16, 1946. W. DUBILIER 2,398,417
ELECTRICAL CAPACITOR
Filed Nov. 25, 1942
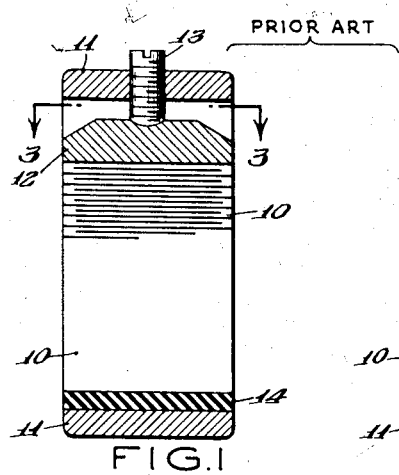
FIG.1. FIG.2.
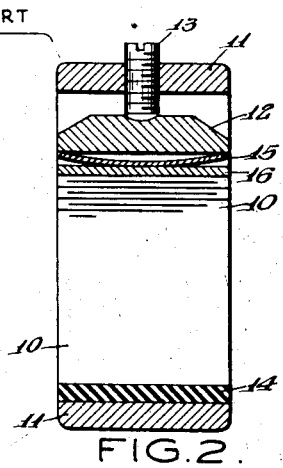
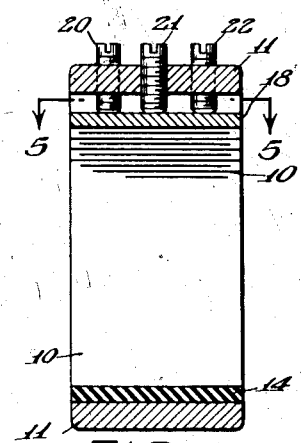
FIG.4.
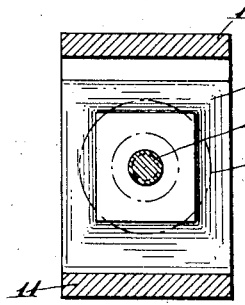
FIG.3.
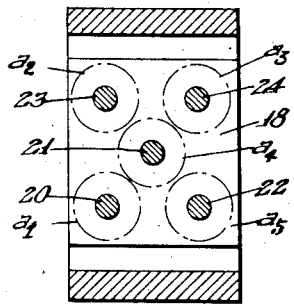
FIG.5.
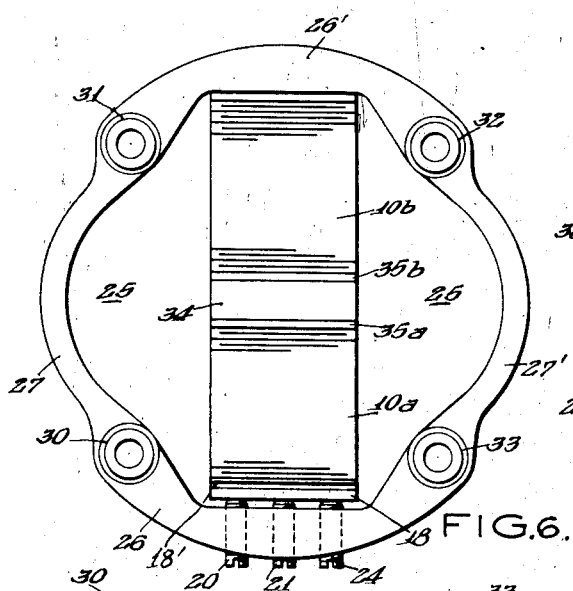
FIG.6.
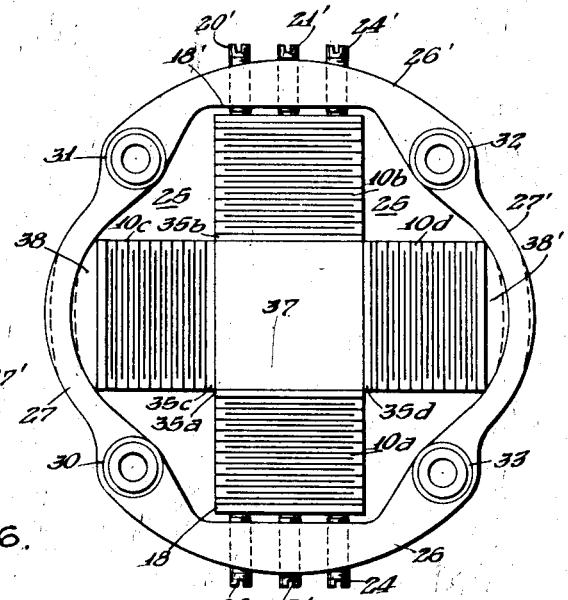
FIG.8.
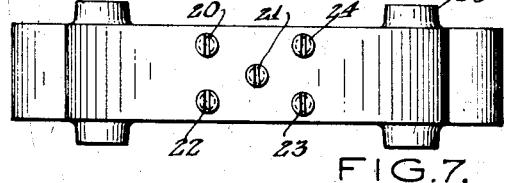
FIG.7.
INVENTOR.
William Dubilier
BY
ATTORNEY Patented Apr. 16, 1946

2,398,417

UNITED STATES PATENT OFFICE 2,398,417

ELECTRICAL CAPACITOR

William Dubilier, New Rochelle, N. Y., assignor to Cornell-Dubilier Electric Corporation, South Plainfield, N. J., a corporation of Delaware Application November 25, 1942, Serial No. 466,901

1 Claim. (Cl. 175—41)

The present invention relates to high voltage capacitors and more particularly to capacitors of the stacked type designed for high operating frequencies and to carry heavy currents.

Stacked capacitors of known construction commonly comprise a plurality of alternate layers of conducting elements interleaved with dielectric elements such as sheets of metal foil and mica. Alternate metallic layers usually extend beyond the opposite edges of the dielectric sheets, the projecting portions of the layers being united to serve as electric terminals of the capacitor unit. According to an alternative construction, the insulating sheets overlap the conductive sheets on all sides, the latter being disconnected from any outside terminal with the exception of the end layers of the stack connected to suitable terminals to provide a so-called floating electrode type high voltage capacitor.

The metallic and dielectric elements in stacked capacitors of the above character are maintained in juxtaposed relation and with their respective surfaces in more or less intimate contact by the provision of one or more pressure applying clamps encircling and compressing the capacitor stacks. In order to ensure sufficient electrical stability of a capacitor of this type, heavy and bulky clamp structures to exert substantial and uniform compression forces upon the stacks are required in the capacitor constructions at present known in the art to maintain the dielectric and metallic elements in intimate contact and prevent relative movements thereof and consequent variations of the capacitance and other drawbacks and defects well known to those skilled in the art.

The application of a considerable pressure to a capacitor stack to ensure a desired degree of electrical stability entails various drawbacks such as increase of the size and bulk of the capacitor, excessive eddy current losses in the metal parts forming the clamp structure, damage of the dielectric and metallic elements in the stack, and other losses and defects resulting therefrom and being well known to those skilled in the art. Furthermore, with the present clamp structure requiring heavy clamping screws or bolts to obtain adequate stack pressure in a capacitor, the pressure may be relaxed after a certain period of time due to fatigue effects of the metal and other causes as a result of heat and other influences. This, in turn, may cause a substantial impairment of the electrical stability, decreased life of the capacitor and other defects well known.

Numerous attempts have been made in the past to remedy the above drawbacks and deficiencies and to ensure sufficient electrical stability of stacked type capacitors, in particular capacitors subject to substantial temperature variations during operation. Such attempts which included the impregnation of the capacitor stacks with wax, oil, resin or other impregnating substance have however not been entirely satisfactory to comply with all the requirements under various operating conditions, in particular in the case of capacitors designed to operate under high frequencies and/or to carry substantial operating currents. In the latter case, the combined heating losses due to both ohmic, eddy current and other effects may assume unusual proportions and require special precautions.

Accordingly, an object of the invention is the provision of a stack type capacitor of the above character with an improved clamp structure to maintain sufficient and even pressure over substantially the entire active surface of the capacitor stack with a minimum of clamping force while at the same time facilitating the assembly of the capacitor, the pressure application being substantially constant during the operation under various conditions resulting in high electrical stability and reduction of electrical losses in the capacitor.

Another problem involved in the construction of high voltage capacitors to ensure sufficient electrical stability, as pointed out, is the provision of a suitable and efficient clamp of small size and bulk for holding a capacitor stack under adequate and constant compression. By the present invention there is provided a novel clamp construction for stack type capacitors which, while insuring efficient and substantially uniform pressure over the entire effective stack area, will enable a considerable reduction of the size and bulk of the clamp, thereby both reducing the size of the capacitor and resulting in a considerable decrease of the losses due to eddy currents and other causes generated in the clamp by stray fields in the vicinity of the capacitor stack.

A requirement for a capacitor clamp, in addition to holding the metal and dielectric elements in proper juxtaposed relation and preventing relative movements as a result of mechanical or electrical forces, is that the clamp allow of ready expansion and contraction of the stack under varying temperatures to substantially prevent stack pressure variations and impairment of the electrical stability of the capacitors under various operating conditions. In other words, in addition to providing sufficient mechanical strength to insure adequate stack pressure, the clamp should be capable of yielding to or following the varying pressure in the stack due to expansion and contraction under varying ambient and internal temperature changes, or allowing the capacitor to "breathe" and maintain a substantially invariant stack pressure independently of temperature and other influences.

Still another object of the invention is therefore to provide a clamp for an electrical capacitor which, while insuring adequate stack pressure, possesses sufficient inherent resiliency to enable ready expansion and contraction of the capacitor stack so as to maintain high electrical stability and a substantially invariant capacitance under varying operating temperatures.

Another object of the invention is to provide an improved clamp structure for electric capacitor stacks which is both simple in design, easy to adjust and efficient in operation.

A further object is to provide a greatly simplified terminal mount for heavy duty electrical capacitors.

Further objects and advantages of the invention will become more apparent from the following detailed description taken with reference to the accompanying drawing forming part of this specification and wherein:

Figure 1 is a schematic cross-sectional view through a high voltage capacitor of known construction illustrative of the common method of compressing a capacitor stack; Figure 2 is a view similar to Figure 1 illustrating a well known improvement to increase the electrical stability of a capacitor; Figure 3 is a cross-sectional view taken on line 3—3 of Figure 1; Figure 4 is a cross-section through a stacked capacitor and clamp structure constructed in accordance with the principles of the invention; Figure 5 is a cross-sectional view taken on line 5—5 of Figure 4; Figure 6 is a top view of a preferred clamp structure for a so-called central terminal type capacitor assembly embodying the principles of the invention; Figure 7 is a front view of Figure 6, and Figure 8 is a further top view illustrating a modification of a capacitor and clamp arrangement similar to Figure 6.

Like reference characters identify like parts throughout the different views of the drawing.

Referring more particularly to Figure 1, I have shown in a schematic manner, a high voltage capacitor stack 10 of well known construction. The stack consists in a known manner of interleaved alternate sheets of conducting and dielectric material such as alternate metal foil and mica sheets superposed upon each other. The capacitor may be of any known type designed for operation under high voltage such as in the form of a plurality of individual capacitor sections separated by insulating spacers and electrically connected in series as shown e. g. in applicant's U. S. Patent No. 1,334,140, or in the form of a floating electrode arrangement wherein a plurality of stacked dielectric sheets are interleaved with conducting sheets completely isolated by said dielectric sheets as shown e. g. in applicant's U. S. Patent No. 1,575,044, or of any other construction of high voltage capacitors known in the art.

The stack 10 is maintained in a known manner under compression by means of a clamp 11 usually having the form of a metal frame surrounding the stack. In the example illustrated, the stack is placed with one end against one side of the clamp, a suitable insulating spacer 14 being interposed to prevent a short circuit to the clamp. The other end of the stack is covered by a pressure member or plate 12 pressed against the stack by means of a screw or bolt 13 engaging a threaded bore in the opposite side of the clamp 11. A clamp structure of this type is shown in the above mentioned Patent No. 1,575,044.

In clamp constructions of the general type shown in Figure 1, a comparatively heavy pressure plate 12 of substantial thickness and rigidity and a heavy bolt or clamping screw are required to ensure a more or less even pressure application to as large a portion of the effective stack area as possible. When using a single screw or bolt as shown in Figure 1, it is evident that a heavy and rigid pressure plate and a considerable compression force will be required to ensure anything like even pressure distribution over a greater section of the stack area. In fact, even when using clamping structures and pressure plates of the strongest type which are practically and economically feasible, the effective pressure area will be restricted to an area as indicated at $a$ in Figure 3 depending on the size and rigidity of the pressure plate or block 12 and of the bolt 13, inasmuch as a perfectly rigid pressure plate is neither obtainable nor practical for the present purpose. Although clamp structures of this type may be sufficient for average uses and requirements, added difficulties will be encountered in case of heavy duty capacitors especially when intended for use in high or ultra high frequency apparatus.

For the above metioned reasons, heavy clamps and rigid and bulky pressure plates and bolts are required for high voltage capacitor constructions at present known in the art. This in turn, besides increasing the size and bulk as well as costs of the capacitor, has the drawback of a substantial increase of the losses due to eddy currents and other causes generated in the metal masses in the immediate vicinity of the capacity stack. Unequal pressure distribution may also cause impairment of the intimate contact between the elements in the stack, resulting in open spaces or voids which in turn will give rise to losses and impair the electrical stability and reduce the life of the capacitor, as is well understood by those skilled in the art. A certain improvement in this respect and equalization of the stack pressure are obtained by the provision of a resilient member in the form of a flat spring 15 interposed between the pressure plate 12 and a further cover or end plate 16 as shown in Figure 2. However, even with this expedient, the clamping structure assumes considerable proportions, in particular in the case of heavy duty capacitors intended for use in high and ultra-high frequency circuits, if any thing like low losses, satisfactory pressure distribution, and electrical stability of the capacitor is desired.

Moreover, a heavy and rigid clamping plate and a single clamping bolt as used in the prior art constructions makes it difficult to properly control and adjust the stack pressure during the manufacture and assembly of the capacitor by reason of the fact that such a bolt is liable to bind or freeze and accordingly will afford little flexibility and adaptability in regulating and adjusting the stack pressure in addition to other drawbacks and defects well understood.

By the employment of a novel clamp structure according to the present invention, not only are the size of the clamping members and the amount of metal masses in the vicinity of the capacitor stack reduced considerably but a substantially more uniform and even pressure distribution over the entire effective stack area which can be easily and accurately controlled and adjusted may be realized in a most easy and simple manner.

A capacitor embodying the principles of the invention is schematically illustrated in Figures 4 and 5. In the latter, the pressure plate 18 placed upon the stack has a considerably lesser thickness and rigidity than the plate 12 required in the prior art construction according to Figures 1 to 3. In order to obtain a substantially even pressure distribution over the entire stack area of the capacitor, a number, in the example shown five, comparatively small clamping screws or bolts 20 to 24 are provided evenly spaced from each other and distributed over the effective stack area as shown in Figure 5. In this manner, a plurality of separate pressure areas $a_1$ to $a_5$ are created so arranged as to sufficiently adjoin or overlap each other to result in a practically uniform pressure distribution over the entire stack area. This makes it possible to use a clamping plate of considerably reduced thickness and rigidity and which may consist either of metal or a suitable insulating material such as Bakelite, Micalex or the like. As is understood, the number of clamping screws may be varied to suit any existing or special requirements.

From the foregoing, it will be evident that the employment of an improved clamp construction according to the invention results both in a considerable reduction of the size and bulk of the clamp and a substantial increase of the effectiveness of the clamp compared with the prior art constructions for an equivalent capacitor shown in Figures 1 and 2.

Referring to Figures 6 and 7, I have shown an improved clamp structure 25 according to the invention for a high voltage capacitor of the known center terminal type constructed in accordance with the principles of the invention. The capacitor unit shown comprises two stacks 10a and 10b placed end to end against the opposite faces of an insulating spacer or pressure member 34. The clamp has a substantially annular shape and comprises two rigid opposite sections 26 and 26' of relatively great thickness having plane inner stack engaging surfaces for clamping the stacks 10a and 10b therebetween and intermediate sections 27 and 27' of relatively lesser thickness or rigidity to provide the necessary resiliency of the clamp in the direction of the stack axis. A number of, in the example shown four, perforate bosses or projections 30 to 33 extend on either side of the clamp separated by spacing angles of 90° in the example illustrated. These extensions serve as means for mounting several clamps and associate capacitor sections one above the other with the sections sufficiently spaced from each other to obtain a multiple capacitor assembly.

The outermost conductive elements of the stacks 10a and 10b are in direct electrical contact with the clamp 25 which latter acts as one, usually the grounded or zero potential, terminal of the capacitor, while the innermost electrodes of the stacks are connected to suitable terminal strips 35a and 35b interposed between the stacks and the spacer or pressure member 34. The strips 35a and 35b may be connected to a second usually the high potential terminal insulated from the clamp by any suitable terminal mount structure. The stacks are clamped by means of a pressure plate and multiple bolt arrangement as shown at 18 and 20 to 24 in a manner substantially similar to that described with reference to Figures 4 and 5.

In place of a single pressure plate, a plurality of plates of lesser thickness may be provided as shown at 18 and 18' in Figure 6, both to serve as spacing elements and to provide increased flexibility in conforming to irregularities in the surface of the stack which practically cannot be made completely smooth or flat.

According to a modification shown in Figure 8, the clamp 25 may serve for compressing four capacitor stacks 10a, 10b, 10c and 10d arranged in radial formation at right angle to each other like the spokes of a wheel and having their inner ends abutting and pressed against a square-shaped central pressure block 37 of suitable insulating material such as ceramic, Bakelite, or the like. In Figure 8, the stacks 10a and 10b are mounted and compressed in substantially the same manner as in the case of Figure 8 and stacks 10c and 10d are placed between the remaining faces of the block 37 and the sections 27 and 27' of clamp 25 with suitably shaped end blocks 38 and 38', respectively, being inserted between the clamp and the outer ends of the sections. In this manner, sections 10c and 10d will be automatically compressed against the block 37 by the contraction or deformation of the clamp sections 27 and 27' when the screws 20 to 23 are tightened to clamp sections 10a and 10b causing thereby the clamp to be reformed from a substantially circular to a slightly oval or elliptical shape as indicated in dotted lines in the drawing. In order to insure symmetry and even pressure in all the stacks, a second set of clamping screws 20' to 24' may be provided passing through the clamp section 26' and engaging a pressure plate 18' overlying the outer face of stack 10b. By successive and gradual tightening of all the screws it is possible in this manner to obtain uniform and substantially evenly distributed pressure in all the stacks.

In order to further improve the symmetry and adjustment of the pressure in the various stacks, additional sets of clamping screws may be mounted in the portions 27 and 27' of the clamp similar to the screws 20 to 24 and 20' to 24'.

While I have shown and described a few desirable embodiments of the invention, it is understood that this disclosure is for the purpose of illustration and that various changes in shape, proportion, and arrangement of parts as well as the substitution of equivalent elements for those herein shown and described may be made without departing from the spirit and scope of the invention as defined in the appended claim. The specification and drawing are accordingly to be regarded in an illustrative rather than in a limiting sense.

I claim:

An electrical capacitor structure comprising a square-shaped central support, capacitor stacks comprising interleaved conducting and dielectric elements and each having one end engaging a face of said support, whereby said support forms a central abutment for said stacks grouped radially about said support, an annular-shaped clamp embracing and engaging the outer ends of said stacks, said clamp having opposite stack-engaging sections for one pair of diametrically opposed capacitor stacks of relatively large thickness and having opposite stack-engaging sections for the other pair of diametrically opposed stacks of relatively small thickness, whereby to provide a desired resiliency in the direction of the axis of said first-mentioned pair of stacks, and clamping screw means passing through said clamp and engaging at least one of said first-mentioned pair of stacks, whereby to deform said clamp and to uniformly compress all said stacks against said support.

WILLIAM DUBILIER.